United States Patent [19]
Jordan et al.

[11] 3,973,983
[45] Aug. 10, 1976

[54] CARBON BLACK PIGMENTS AND RUBBER COMPOSITIONS CONTAINING THE SAME

[75] Inventors: Merrill E. Jordan, Walpole; William G. Burbine, Whitman, both of Mass.

[73] Assignee: Cabot Corporation, Boston, Mass.

[22] Filed: Aug. 8, 1974

[21] Appl. No.: 495,814

Related U.S. Application Data

[63] Continuation-in-part of Ser. No. 95,981, Dec. 7, 1970, abandoned.

[52] U.S. Cl. ................................ 106/307; 423/445; 423/456
[51] Int. Cl.² ........................................... C09C 1/48
[58] Field of Search ............ 106/307; 423/445, 450, 423/455, 458, 460, 456

[56] References Cited
UNITED STATES PATENTS

| | | | |
|---|---|---|---|
| 3,443,901 | 5/1969 | Wendell et al. | 423/456 |
| 3,565,586 | 2/1971 | Kiyonaza | 423/456 |
| 3,595,618 | 7/1971 | Kiyonaza et al. | 423/458 |
| 3,725,103 | 4/1973 | Jordan et al. | 106/307 |

*Primary Examiner*—Patrick P. Garvin
*Assistant Examiner*—J. V. Howard
*Attorney, Agent, or Firm*—Jack Schuman; Lawrence A. Chaletsky; Barry R. Blaker

[57] ABSTRACT

This disclosure relates to a certain class of carbon black products having high surface area and very low degree of porosity and the use thereof as reinforcing additives in the preparation of rubber compositions having improved properties.

6 Claims, No Drawings

CARBON BLACK PIGMENTS AND RUBBER COMPOSITIONS CONTAINING THE SAME

This application is a continuation-in-part of U.S. application Ser. No. 95,981, filed Dec. 7, 1970, now abandoned.

This invention relates to a novel class of carbon black products which have high surface area and which are virtually non-porous. Heretofore, it has been acknowledged by those skilled in the art of porosity measurement, that a significant degree of porosity is always present in carbon black pigments having a critical high surface area. In particular, it has been believed that all carbon black pigments exhibit a significant degree of porosity at a BET total surface area of at least about 140 m²/g.

It has now been found, however, that there may be prepared a novel class of carbon black pigments having total surface areas of at least about 160 m²/g which, indeed, are essentially non-porous. The non-porosity of the carbon black pigments is defined, for purposes of this invention, as the ratio of $t$ area to BET total surface area wherein the value for the ratio is at least 0.9. In general, this class of carbon black pigments has been found useful for special black and particularly for rubber applications.

This invention relates also to new and useful natural and synthetic rubber compositions. In particular, this invention relates to new and improved rubber compositions comprising a natural or synthetic rubber and the carbon black products having high surface area and virtually no porosity which improve the physical properties of the rubber to which it is added.

Normally, there have been widely employed as fillers and reinforcing pigments in the compounding and preparation of rubber compositions various conventional carbon blacks known heretofore. Ordinarily, the conventional carbon blacks are effective in the preparation of rubber vulcanizates having improved reinforcement properties such as tensile strength, modulus and treadwear. The improvement in properties exhibited by an elastomeric article or rubber stock filled with a carbon black will depend to a great extent upon the type of elastomer utilized and the particular carbon black incorporated therein. It has now been made possible by using the carbon black products of the present invention to provide finished products having still further improved tensile strength modulus, abrasion resistance and treadwear.

Accordingly, it is a primary object of this invention to provide a novel class of carbon black products.

Further, it is a principal object of this invention to provide improved natural and synthetic rubber compositions.

It is a further object of this invention to provide a suitable carbon black reinforcing additive for natural and synthetic rubbers which imparts the desired properties to the resultant composition.

It is a further object to provide a novel class of carbon blacks which are useful in various special blacks applications and in rubber applications.

Other and different objects, advantages and features of the present invention will become apparent to those skilled in the art upon consideration of the following detailed description.

In accordance with this invention, it has been found that the above and still further objects are achieved by the preparation of novel carbon black products which have a total surface area of at least 160 m²/g and are essentially non-porous, i.e., have a value for the ration of $t$ curve area to total BET surface area of at least 0.9. It is preferred that the novel carbon black products have a total surface area of at least 170 m²/g. As described in more detail hereinafter, the present invention includes a novel group of carbon blacks characterized by having a total BET surface area of at least 160 m²/g and which are essentially non-porous, i.e., have a value for the ratio of $t$ curve area to total BET surface area of at least 0.9. Furthermore, the blacks of the present invention are characterized by having a value of less than 317 for the relationship of [tinting strength $+ 0.6\ (D_a)$], hereinafter referred to as the tint factor. In this tint factor relationship, $D_a$, the apparent diameter, is defined as the diameter in millimicrons, of a solid carbon sphere containing the same amount of carbon as the average amount of carbon per agglomerate in a paper by Avrom I. Medalia and L. Willard Richards entitled, "Tinting Strength of Carbon Black" presented to the American Chemical Society, Division of Coatings and Plastic Chemistry, Toronto, Canada, May 1970. The apparent diameter, $D_a$, is readily obtained from the calculation $2270 + 63.5\ (DBP)/$Iodine Surface Area. In a preferred embodiment of the present invention, the novel carbon blacks have a total BET surface area of at least 170 m²/g. In all instances, however, the novel blacks of the present invention have a value for dibutyl phthalate (DBP) absorption on pellets of at least 90 cc/100 gms of carbon black, preferably at least 100 cc/100 gms of carbon black. The blacks of this invention are in fact unique when it is noted that the prior art considered that blacks having surface areas of about 130 m²/g represented the upper limit before which porosity appears. Quite to the contrary, it has now been found that there are essentially non-porous blacks having much higher surface areas and also that these blacks are eminently suitable for reinforcing rubber and improving roadwear properties.

Indeed, the matter involving porosity of carbon blacks generally has been considered in an article entitled, "Porosity Studies on Some Oil Furnace Blacks," by W. R. Smith et al. appearing in *Rubber Chemistry and Technology*, Volume 3, No. 5, September 1970, pages 960 through 968. In this article, written by the same W. R. Smith who is the author of the section on carbon black in the well-known *Kirk-Othmer Encyclopedia of Chemical Technology*, the state of the art is shown to be such that carbon blacks having BET nitrogen surface areas greater than 130 m²/g tend to exhibit porosity. It is described therein that, once the surface area of 130 m²/g is exceeded, the porosity of a black increases as the surface area is increased. As described further hereinafter, blacks of a nature contradictory to that expected by the art have been made and have now been established as excellent rubber grade reinforcing blacks.

In preparing the reinforced rubber compositions of this invention, amounts of the carbon black product ranging from about 10 to about 250 parts by weight can be used for each 100 parts by weight of rubber in order to impart a significant degree of reinforcement thereto. It is, however, preferred to use amounts varying from about 20 to about 100 parts by weight of carbon black per 100 parts by weight of rubber and especially preferred is the utilization of from about 40 to 80 parts of carbon black per 100 parts of rubber.

The rubbers for which the novel carbon blacks of this invention are effective as reinforcing agents include natural and synthetic rubbers. Among the rubbers suitable for use with the present invention are natural rubber and its derivatives such as chlorinated rubber; copolymers of from about 10 to about 70 percent by weight of styrene and from about 90 to about 30 percent by weight of butadiene such as a copolymer of 19 parts styrene and 81 parts butadiene, a copolymer of 30 parts styrene and 70 parts butadiene, a copolymer of 43 parts styrene and 57 parts butadiene and a copolymer of 50 parts styrene and 50 parts butadiene; polymers and copolymers of conjugated dienes such as polybutadiene, polyisoprene, polychloroprene, and the like, and copolymers of such conjugated dienes with an ethylenic group containing monomer copolymerizable therewith such as styrene, methyl styrene, chlorostyrene, acrylonitrile, 2-vinyl-pyridine, 5-methyl-2-vinylpyridine, 5-ethyl-2 vinylpyridine, 2-methyl-5-vinylpyridine, alkyl-substituted acrylates such as vinyl ketone, methyl isopropenyl ketone, methyl vinyl ether, alphamethylene carboxylic acids and the esters and amides thereof such as acrylic acid and dialkylacrylic acid amide; also suitable for use herein are copolymers of ethylene and other high alpha olefins such as propylene, butene-1 and pentene-1; particularly preferred are the ethylene-propylene copolymers wherein the ethylene content ranges from 20 to 90 percent by weight and also the ethylenepropylene polymers which additionally contain a third monomer such as dicylopentadiene, 1, 4-hexadiene and methylene norbornene.

The novel class of carbon blacks are readily prepared by contacting a carbon black-producing feed-stock with a stream of hot combustion gases flowing at an average linear velocity of at least 100 feet per second. The process for preparing the novel carbon blacks of the present invention will be described in greater detail hereinafter.

In the preparation of the hot combustion gases employed in producing the carbon blacks of the present invention, there are reacted in any conventional combustion chamber a liquid or gaseous fuel and an oxygen-containing oxidant stream. Exemplary oxidant streams include air, oxygen, mixtures of air and oxygen, nitrogen and oxygen, and other mixtures of oxygen with common gases. It is preferred, however, that the oxidant stream to be used in the present invention comprise an amount greater than about 50 % molar concentration of oxygen. Among the fuels suitable for use in reacting with an oxidant stream in a combustion chamber to generate hot combustion gases there are included any of the readily combustible gas, vapor or liquid streams such as hydrogen, carbon monoxide, methane, acetylene, alcohols, kerosene and the like. It is generally preferred, however, to utilize fuels having a high content of carbon-containing components and, in particular, hydrocarbons. For example, streams rich in methane such as natural gas and modified or enriched natural gas are excellent fuels as well as other streams containing high amounts of hydrocarbons such as various petroleum gases and liquids and refinery by-products including ethane through pentane fractions, fuel oils and the like. In general, the heavier and more viscous tars and residual type oils should preferably be used with the more concentrated or relatively pure oxygen-containing oxidant streams. The novel carbon blacks of the present invention are prepared by reacting the aforementioned combustion reaction products with any of a wide variety of hydrocarbon feedstocks.

Accordingly, the above-described novel class of nonporous carbon blacks are prepared by reacting a carbon black-yielding hydrocarbon feedstock with hot gaseous products of an initial combustion reaction which are flowing at a high linear velocity in a suitable reaction zone. The hot combustion gases are readily generated by contacting the desired oxidant stream with a combustible fuel in any type of conventionally known burner designed to produce a stream of hot combustion gases flowing at a high linear velocity. In a preferred embodiment of the present invention a combustible fuel is contacted with an oxidant stream containing at least 50 percent molar concentration of oxygen in a suitable burner under a pressure ranging up to about 120 p. s. i. g. with the most preferred combustion pressure varying from about 5 to about 75 p. s. i. g. Under these conditions, there is produced a stream of gaseous combustion products possessing sufficient energy to convert a carbon black-yielding hydrocarbon feedstock to the desired carbon black products. The resultant combustion gases emanating from the combustion zone may attain temperatures up to and greater than 5000° to 6000°F, with the most preferable temperatures for the present process being at least about 3000°F. The hot combustion gases flow in a downstream direction at a high linear velocity which may be effectuated by passing the combustion gases through any suitable passage or inlet which may be tapered or restricted such as a conventional venturi throat. Into the resultant stream of hot combustion gases traveling at a high velocity there is then introduced a suitable carbon black-yielding hydrocarbon feedstock thus insuring a high rate of mixing and shearing of the hot combustion gases and the hydrocarbon feedstock so as to completely decompose and convert the feedstock to the novel carbon blacks in high yields. The manner in which the carbon black-yielding hydrocarbon feedstock is introduced into the hot combustion gases traveling at a high linear velocity may be varied considerably. For example, the hydrocarbon feedstock may be introduced into the hot combustion gases through an opening in the reaction chamber which causes the entry to be in a direction substantially perpendicular to the longitudinal axis of the flow of combustion gases. Alternately, the hydrocarbon feedstock may be introduced radially through a suitable probe type device into the reaction zone. It is preferred, however, that the hydrocarbon feedstock be injected substantially transversely from the outer periphery of the stream of hot combustion gases in the form of a single or a plurality of small, coherent jets which penetrate into the interior regions of the stream of combustion gases. Following the period of reaction in the reaction zone which may vary from about 1 to about 100 milliseconds, or even shorter periods of time, the effluent gases containing the novel carbon black products suspended therein are passed downstream to any conventional cooling and separating means whereby the novel carbon blacks are recovered. The separation of the carbon black from the gas stream is readily accomplished by conventional means such as a precipitator, cyclone separator and bag filter. The amounts of oxidant gas, fuel and carbon black-yielding hydrocarbon feedstock may be readily determined to obtain the desired active carbon blacks having controlled physical properties.

The following testing procedures are used in the determination and evaluation of the physical properties of the novel carbon blacks of the present invention.

DBP Absorption

In accordance with the procedure set forth in ASTM D-2414-65T now designated as ASTM D-2414-70, absorption characteristics of pelleted carbon blacks are determined. In brief, the test procedure entails adding dibutyl phthalate (DBP) to a pelleted carbon black until there occurs a transition from a free-flowing powder to a semi-plastic agglomerate. The value is expressed as cubic centimeters (c.c.) of dibutyl phthalate (DBP) per 100 grams of carbon black.

Total Surface Area

The total surface area of the carbon blacks is measured in accordance with the wellknown BET technique utilizing nitrogen isotherms. The BET (Brunauer-Emmet-Teller) method is completely described in an article appearing in the Journal of the American Chemical Society, Vol. 60, page 309 (1938). Surface areas obtained in the usual manner by the BET technique include the external surface area as well as the internal surface area contributed by the presence of pores.

Iodine Surface Area

The surface area of pelletized carbon black products is determined in accordance with the following iodine adsorption technique. In this procedure, a carbon black sample is placed into a porcelain crucible equipped with a loose-fitting cover to permit escape of gases. The black is devolatized for a seven-minute period at a temperature of 1700°F in a muffle furnace and then allowed to cool. The top layer of calcinated carbon is discarded to a depth of one-fourth inch and a portion of the remaining black is weighed. To this sample there is added a 100 milliliter portion of 0.01 N iodine and the resulting mixture is agitated for 30 minutes. A 50-milliliter aliquot of the mixture is then centrifuged until the solution is clear, following which 40 milliliters thereof is titrated with 0.01 N sodium thiosulfate solution until the free iodine is adsorbed using a 1 percent soluble starch solution as an end point indicator. The percent of iodine adsorbed is determined quantitatively by titrating a black sample. Finally, the iodine surface area expressed in square meters per gram is calculated in accordance with the formula $$\frac{(\% \text{ Iodine Adsorbed} \times 0.937) - 4.5}{\text{Sample weight}} = \text{Iodine Surface Area}$$

This procedure for determining iodine surface areas of carbon black pellets is designated as Cabot Test Procedure No. 23.1 for purposes of convenience, inasmuch as there is still no official ASTM designation. As shown in a Cabot Corporation publication, TG-70-1 entitled, "Industry Reference Black No. 3" by Messrs. Juengel and O'Brien published on April 1, 1970, the iodine surface area of IRB No. 3 (Industry Reference Black No. 3) is 66.5 m²/g as determined in accordance with Cabot Test Procedure 23.1 referred to hereinabove.

Tinting Strength

Tinting strength represents the relative covering power of a pelletized carbon black when incorporated in a 1 to 37.5 weight ratio with a standard zinc oxide (Florence Green Seal No. 8 made and sold by New Jersey Zinc Company) dispersed in an epoxydized soybean oil type plasticizer (Paraplex C-62, made and sold by Rohm and Haas Company) and compared to a series of standard reference blacks tested under the same conditions. More particularly, the test involves mulling carbon black, zinc oxide, and plasticizer in such proportions that the resulting ratio of carbon black to zinc oxide is 1 to 37.5. Reflectance measurements utilizing a Welch Densichron apparatus are then obtained from film cast on a glass plate and readings are compared to carbon black standards having known tinting strengths. The tinting strengths of the carbon black standards are determined utilizing an arbitrarily assigned value of 100 percent for the tinting strength of the Cabot standard SRF carbon black. In this instance, as is conventionally done, the standard SRF carbon black arbitrarily assigned a value of 100 percent for tinting strength is Sterling S or Sterling R semi-reinforcing furnace black made by Cabot Corporation. Each of the Sterling R or Sterling S reference blacks is characterized by having, among other properties, a BET nitrogen surface area of about 23 m²/g, an oil absorption of about 65 to 70 lbs. oil/100 lbs. black, and an average particle diameter of about 800 angstroms as determined by electron microscopy. The only difference is that Sterling R carbon black is in a fluffy form while the Sterling S carbon black is in pelleted form. Accordingly, the black selected for reference purposes then is determined by the state of the blacks to be measured for tinting strengths. The Sterling R or Sterling S semi-reinforcing carbon black is thus considered as the primary reference standard for determining tinting strengths of the other blacks.

Furthermore, as described above, additional carbon blacks are utilized as references for establishing tinting strength values covering the range of about 30 to about 250 percent. These are determined relative to the primary standard having the arbitrarily assigned value of 100 percent for tinting.

In this manner, a series of blacks having a wide range of tinting strengths is made available so as to provide reference blacks that approximate as closely as possible the black to be measured. Exemplary carbon blacks employed as auxiliary tinting strength standards for purposes of the above procedure include the following blacks made by Cabot Corporation. The analyticals are determined in accordance with the test procedures set forth in the present application.

| Analytical Properties | Sterling MT (Medium) (Thermal) | Sterling FT (Fine Thermal) | Vulcan 6H | Vulcan 9 |
|---|---|---|---|---|
| Tinting Strength, % SRF | 31 | 56 | 220 | 252 |
| Iodine Surface Area, m²/g | 5.0 | 8.4 | 109.6 | 118.5 |
| DBP Adsorption, cc/100 g | 33.6 | 35.9 | 131.4 | 116.9 |

For purposes of reference, the tinting strength of IRB No. 3 as determined in accordance with the above procedure is 208 percent of the primary Sterling S semi-reinforcing black. This is also disclosed in the earlier mentioned publication on Industry Reference Black No. 3 by Messrs, Juengel and O'Brien.

Roadwear Rating

The procedure for measuring and evaluating roadwear or treadwear is well known to the art and is completely described in Cabot Corporation's Technical Service Report No. TG-67-1 on "The Use of Multi-Section Treads in Tire Testing" by Fred E. Jones (1967). It is to be noted that, as in the case of any procedure for measuring wear ratings, the evaluations are made relative to a standard reference black which is arbitrarily assigned a wear rating value of 100 percent. In this instance the black selected as the reference standard for evaluating roadwear is an ISAF (intermediate super abrasion furnace) type black, having an ASTM designation of N-220, made by Cabot Corporation and further characterized by having a tinting strength of 232 percent, an iodine surface area of 97.9 m$^2$/g, a DBP absorption of 114.9 cc/100 g, and a density of 22.2 lbs./cu. ft. For ease of reference, this treadwear reference black is described as Cabot's ISAF type reference black No. D-6607. The above method for determining relative wear ratings of treadstocks is preferred to the use of laboratory tests for measuring abrasion since it is known to be difficult to extrapolate such results to actual performance. Accordingly, the roadwear results shown herein reflect accurately the performance of treadstocks relative to Cabot's standard ISAF type black No. D-6607 having an arbitrarily assigned value of 100 percent.

In carrying out the above roadwear evaluations there is used the following formulation of ingredients, expressed in parts by weight, which are admixed by means of a Banbury mill.

| Ingredient | Parts by Weight |
|---|---|
| Styrene-butadiene | 89.38 |
| Cis-4-polybutadiene | 35 |
| Carbon Black | 75 |
| Sundex 790 | 25.62 |
| Zinc Oxide | 3 |
| Sunproof Improved | 2.5 |
| Wingstay 100 | 2 |
| Stearic Acid | 2 |
| Santocure CBS | 1.4 |
| Sulfur | 1.75 |

With regard to the foregoing formulation for use in road tests, designated hereinafter as RTF-1, Santocure (CBS) is the trade designation for N-cyclohexyl-2-benzothiazole-sulfenamide, a curing agent for rubber systems; Sundex 790 is the trade name for a plasticizer sold by Sun Oil Company; Sunproof Improved is the trade name for an antiozonant sold by Uniroyal Chemical Company; and Wingstay 100 is the trade name for a stabilizer comprising mixed diaryl-p-phenylene diamines sold by Goodyear Tire and Rubber Company.

Rebound

This is determined in accordance with the procedure set forth in ASTM D-1054-66.

t Area

Surface area of carbon black measured in accordance with a "t curve method" is referred to herein as t area. The t curve method for evaluating microporosity of carbon black is fully described in an article by Mikhail, Brunauer and Bodor entitled "Investigations of a Complete Pore Structure Analysis" in the *Journal of Colloid and Interface Science*, vol. 26, pages 45–53 (1968). The technique taught in this article is followed with the exception that the "master t curve" utilized is one for which Sterling FT carbon black extracted with benzene serves as the nonporous, solid standard absorbent inasmuch as it is more advantageous to employ a carbon black as the master absorbent when evaluating carbon blacks. The fine thermal carbon black selected as the standard, i.e., Sterling FT, is manufactured and sold by Cabot Corporation and is characterized by having a Nigrometer scale value of 106, a BET nitrogen surface area of 15.2 square meters per gram, an iodine surface area of 10.1 m$^2$/g, a tinting strength of 66 percent a pH of 9.7, an electron micrograph particle diameter of 180 millimicrons and a DBP oil absorption value of 40 cc/100 g of carbon black. The difference, if any, between the surface area values obtained on a carbon black sample by BET technique and by means of the t curve method provides a measure of the extent of porosity in the carbon black.

The invention will be more readily understood by reference to the following examples which describe the detailed preparation of representative compounds. There are, of course, many other forms of this invention which will become obvious to one skilled in the art, once the invention has been fully disclosed, and it will accordingly be recognized that these examples are given for the purpose of illustration only, and are not to be construed as limiting the scope of this invention in any way.

EXAMPLE 1

In this example, there is employed a suitable reaction apparatus provided with means for supplying the combustion gas-producing reactants, i.e., a fuel and an oxidant stream, either as separate streams or as precombusted gaseous reaction products, and also means for supplying the carbon black-yielding hydrocarbon feedstock to the apparatus. The apparatus may be constructed of any suitable material such as metal and either provided with a refractory insulation or surrounded by means for cooling with a recirculating liquid which is preferably water. Additionally, the reaction apparatus is equipped with temperature and pressure recording means, means for quenching the carbon black-forming reaction such as spray nozzles, means for cooling the resultant carbon black product and means for separating and recovering the carbon black from other undesired by-products. Accordingly, in carrying out the process for preparing this class of novel active carbon blacks, the following procedure is employed. In order to obtain the desired flame, there are charged into a combustion zone of the apparatus through one or more inlets oxygen at a rate of 2000 SCFH and natural gas at a rate of 625 SCFH thereby generating a stream of combustion gases flowing in a downstream direction at a high linear velocity. In one preferred embodiment of the present invention, however, the rapidly flowing stream of combustion gases may be passed through a constricted or tapered portion of the apparatus having a fixed cross section or throat such as a conventional venturi throat in order to increase the linear velocity of the stream of combustion gases. There is then introduced into the resultant stream of hot combustion products a carbon black yielding hydrocarbon feedstock through one or more passages or inlets located peripherally to the stream of combustion gases at a rate of 15.8 gallons per hour. The hydrocarbon feedstock employed is Sunray DX which is a fuel having a carbon content of 91.1 percent by weight, a hydrogen content of 7.9 percent by weight, a sulfur content of 1.3 percent by weight, a hydrogen to carbon ratio of 1.04, a B.M.C.I. Correlation Index of 133, a specific gravity in accordance with ASTM D-287 of 1.09, an API gravity in accordance with ASTM D-287 of −2.6, an SSU viscosity (ASTM D-88) at 130°F of 350, an SSU viscosity (ASTM D-88) at 210°F of 58 and an asphaltenes content of 5.7 percent. Potassium chloride is added in an amount of 3 grams per 100 gallons of feedstock. The reaction conditions used in this instance are such as to provide a reaction zone residence time of 4 milliseconds and an overall combustion of 30.2 percent. The carbon black-forming reaction is then quenched with water in a separate zone downstream of the reaction zone and the resultant carbon black-containing gases are subjected to the conventional steps of cooling, separation and recovery of the carbon black product. The carbon black product thus obtained is characterized by having an iodine surface area of 141 m$^2$/g, a BET total surface area of 170 m$^2$/g, a $t$ area of 162 m$^2$/g, a value for the ratio of $t$ area to BET area of 0.95; a Nigrometer scale reading of 80, which value represents the relative amount of light reflected compared to a standard black dispersion in oil; a tinting strength of 225 percent which value represents the relative covering power of a carbon black when incorporated in a one part in thirty parts ratio with a standard zinc oxide dispersion in a standard oil and compared to a series of standard reference blacks tested under similar conditions; an extract value of 0.03 percent by weight which is the amount of matter removed from the carbon black by refluxing a sample of the black in ten times its weight of benzene for a 12 to 22 hour period; and a DBP value of 145. The value for the apparent diameter, $D_a$, is 81.4; and the value for the tint factor relationship of [tint + 0.6 ($D_a$)] is 304.

EXAMPLE 2

Following the procedure of Example 1 there are charged to a combustion zone a stream of oxygen at a rate of 2000 SCFH and a stream of natural gas at a rate of 540 SCFH to produce the desired flame. Into the gaseous products of the combustion reaction there is then fed as the hydrocarbon feedstock Sunray DX at a rate of 17.3 gallons per hour and the reaction conditions are maintained so as to provide a residence time of 6 milliseconds and produce an overall combustion of 30.8 percent. As an additive, potassium chloride is added in an amount of 7.3 grams per 100 gallons of feedstock utilized. The resultant reaction product comprises a carbon black having an iodine surface area of 130 m$^2$/g, a BET total surface area of 160 m$^2$/g, a $t$ area of 154 m$^2$/g, a value for the ratio of $t$ area to BET area of 0.96, a Nigrometer scale reading of 81.5, a DBP of 142, a tinting strength of 254, and an extract value of 0.03 percent. The apparent diameter, $D_a$, is determined to be 86.8 and the value for the tint factor relationship of [tint + 0.6 ($D_a$)] is 306.

EXAMPLE 3

In accordance with the procedure of Example 1, oxygen at a rate of 1960 SCFH and natural gas at a rate of 350 SCFH are fed into the combustion zone of the reaction apparatus. To the resultant downstream flow of hot combustion gases there is charged Gulf Oil hydrocarbon feedstock at a rate of 18.1 gallons per hour. The Gulf Oil feedstock is a fuel having a carbon content of 89.1 percent by weight, a hydrogen content of 7.9 percent by weight, a sulfur content of 2.2 percent by weight, a hydrogen to carbon ratio of 1.07, a B.M.C.I. Correlation Index of 126, a specific gravity in accordance with ASTM D-287 of 1.08, an API gravity in accordance with ASTM D-287 of 0.3, an SSU viscosity (ASTM D-88) at 130°F of 103, an SSU viscosity (ASTM D-88) at 210° of 41 and an asphaltenes content of 0.67 percent. Prior to adding the feedstock, potassium chloride is added to the stream of hot combustion gases in amounts of 4 grams per 100 gallons of feedstock used. The reaction is carried out over a reaction residence time of 7.6 milliseconds and at an overall combustion of 30.5 percent. There is obtained a carbon black product having an iodine surface area of 158 m$^2$/g, a BET total surface area of 163 m$^2$/g, a $t$ area of 159 m$^2$/g, a value for the ratio of $t$ area to BET area of 0.97, a Nigrometer scale reading of 79, a DBP of 135, a tinting strength of 260, and an extract value of 0.10 percent. The apparent diameter, $D_a$, of this black is calculated to be 68.6 and the value for the tint factor relationship of [tint + 0.6 ($D_a$)] is 301.

The rubber compositions of this invention are readily prepared by conventional mechanical methods. For example, the rubber and the carbon black reinforcing agents are intimately admixed together on a conventional mixing machine of the type normally used for mixing rubber or plastics such as a Banbury mixer and/or a roll mill in order to insure satisfactory dispersion. The rubber compositions are compounded according to standard industry formulations for both a natural rubber and synthetic rubber-containing formulation. The resulting vulcanizates to be tested are cured at 293°F for 30 minutes when natural rubber is used and for 50 minutes when a synthetic rubber, styrenebutadiene rubber in this instance, is employed. In evaluating the performance of the novel carbon blacks of the present invention, the following formulations are utilized wherein the quantities are specified in parts by weight.

| Ingredient | Natural Rubber Recipe | Synthetic Rubber Recipe No. 1 | Synthetic Rubber Recipe No. 2 | Synthetic Rubber Recipe No. 3 |
| --- | --- | --- | --- | --- |
| Polymer | 100 (Natural Rubber) | 100 (Styrene-Butadiene) | 89.38 (Styrene-Butadiene) | 100 (Styrene-Butadiene) 35 (cis-4 polybutadiene) |
| Zinc Oxide | 5 | 3 | 3 | 3 |
| Sulfur | 2.5 | 1.75 | 1.75 | 1.75 |
| Stearic Acid | 3 | 1.5 | 2 | 1.5 |

-continued

| Ingredient | Natural Rubber Recipe | Synthetic Rubber Recipe No. 1 | Synthetic Rubber Recipe No. 2 | Synthetic Rubber Recipe No. 3 |
|---|---|---|---|---|
| Flexamine | — | 1 | — | 1 |
| Softener Mix | — | — | — | 8 |
| Santocure(CBS) | — | 1.25 | 1.4 | 1.25 |
| Altax (MBTS) | 0.6 | — | — | — |
| Sundex 790 | — | — | 25.6 | — |
| Wingstay 100 | — | — | 2 | — |
| Sunproof Improved | — | — | 2.5 | — |
| Carbon Black | 50 | 50 | 75 | 50 |

With regard to the foregoing formulations, the Softener Mix comprises equal portions of napthenic oil sold under the trade designation Circosol 42 X H by Sun Oil Company and a saturated polymeric petroleum hydrocarbon sold under the trade name Paraplex by C. P. Hall Company. Altax (MBTS) is the trade name of R. T. Vanderbilt Company for mercaptobenzothiazyl disulfide accelerator. Flexamine is the trade designation of an antioxidant sold by U.S. Rubber Company. Santocure (CBS) is the trade designation for N-cyclohexyl-2-benzothiazole-sulfenamide, a curing agent for rubber systems. Sundex 790 is the trade name for plasticizer sold by Sun Oil Company. Sunproof Improved is the trade name for an antiozonant sold by Uniroyal Chemical Company. Wingstay 100 is the trade name for a stabilizer comprising mixed diaryl-p-phenylene diamines sold by Goodyear Tire and Rubber Company.

In the following examples there is demonstrated the advantageous and unexpected results achieved by the use of the carbon black products described hereinabove as additives in rubber formulations. It will, of course, be apparent that the examples, while being illustrative of the present invention, should not be construed as limiting or restrictive in any way.

EXAMPLE 4

On a conventional roll mill there are mixed to a homogeneous blend 100 parts by weight of natural rubber, 5 parts by weight of zinc oxide, 3 parts by weight of stearic acid, 2.5 parts by weight of sulfur, 0.6 parts by weight of mercaptobenzothiazyl disulfide (MBTS) and 50 parts by weight of the carbon black prepared in accordance with Example 2. The resulting compound is subsequently cured at 293°F for a period of 30 minutes. A determination of properties of the vulcanizate gives a value of 51.5 for Mooney viscosity ML-4' at 250°F, a tensile strength of 4180 p.s.i., a 300percent modulus of 2280 p.s.i., an elongation of 500 percent, and a Shore hardness of 60.

EXAMPLE 5

Following the procedure of Example 4 and using in lieu of the carbon black employed therein, 50 parts by weight of the carbon black of Example 3, there is obtained a natural rubber vulcanizate having a 300 percent modulus of 2300 p.s.i., a tensile strength of 3520 p.s.i., an elongation of 420 percent, a Shore A hardness of 69, a Mooney viscosity ML-4' at 212°F. of 90 and a percentage rebound of 56.4.

EXAMPLE 6

100 parts by weight of a copolymer of 23.5 parts styrene and 76.5 parts butadiene, 5 parts by weight of zinc oxide, 2 parts by weight of sulfur, 1.5 parts by weight of stearic acid, 2 parts by weight of mercaptobenzothiazyl disulfide, and 50 parts by weight of the carbon black of Example 2 are mixed on a roll mill to a homogeneous blend designated hereinabove as synthetic rubber recipe No. 1. This recipe is also known as the ASTM standard industry synthetic rubber recipe. Following the normal 50 minute curing time, the vulcanizate is tested for various physical properties. The determinations reveal a value of 35.1 for extrusion shrinkage, a tensile strength of 4750 p.s.i. a 300 percent modulus of 2700 p.s.i., an elongation of 460 percent and a Shore A hardness of 65.

EXAMPLE 7

Following the procedure of Example 6 and using for the carbon black employed therein a carbon black as prepared in Example 3, there is obtained a cured synthetic rubber vulcanizate. The results obtained on this vulcanizate show a 300 percent modulus of 2560 p.s.i., a tensile strength of 4080 p.s.i., an elongation of 430 percent a Mooney viscosity ML-4' at 212°F. of 113, a Shore A hardness of 74 and a percentage rebound of 48.7.

EXAMPLE 8

In this example there is utilized for rubber evaluation purposes the formulation designated hereinbefore as synthetic rubber recipe No. 2. In particular, there are mixed on a Banbury mixer at 150 rpm to a homogeneous blend 89.38 parts by weight of a copolymer of 23.5 parts styrene and 76.5 parts butadiene, 35 parts by weight of cis-4-polybutadiene rubber, 25.6 parts by weight of Sundex 790 which is the trade name for a plasticizer sold by Sun Oil Company, 3 parts by weight of zinc oxide, 2.5 parts by weight of Sunproof Improved which is the trade name for an antiozonant sold by Uniroyal Chemical Company, 2 parts by weight of Wingstay 100 which is the trade name for a stabilizer comprising mixed diaryl-p-phenylene diamines sold by Goodyear Tire and Rubber Company, 2 parts by weight of stearic acid, 1.75 parts by weight of sulfur, 1.4 parts by weight of Santocure (CBS) and 75 parts by weight of the carbon black prepared as shown in Example 1. The carbon black is characterized by having an iodine surface area of 141 m²/g and a BET total surface area of 170 m²/g and a value for the ratio of $t$ area to total surface area of 0.95. The results obtained on this vulcanizate give a value for Mooney viscosity ML-4' at 212°F of 59, a Mooney Scorch TS5/T10 of 17.1/18.4, an extrusion shrinkage of 34.7 percent, a tensile strength of 2800 p.s.i., a 300 percent modulus of 990 p.s.i., an elongation of 590 percent, a Shore hardness of 59 and an Akron angle abrasion volume index of 291. Determinations performed on the Goodrich Flexometer show a static compression of 31.1 percent, a dynamic compression of 8.5 percent and a permanent set of 11.7 percent.

EXAMPLE 9

A cured rubber vulcanizate is produced according to Example 8 with the exception that, for the carbon black utilized therein, 75 parts by weight of carbon black manufactured as described in Example 2 is employed herein. The carbon black of Example 2 possesses a BET total surface area of 160 m²/g and a value for the ratio of $t$ area to BET total surface area of 0.96. Measurements for this vulcanizate reveal a Mooney viscosity of ML-4' at 212°F of 60, an extrusion shrinkage of 34.4 percent, a tensile strength of 2870 p.s.i., a 300 percent modulus of 1090 p.s.i., an elongation of 570 percent, a Shore hardness of 60 and, utilizing the Goodrich Flexometer, a static compression of 31.6 percent, a dynamic compression of 9.2 percent and a permanent set of 11.4 percent.

EXAMPLE 10

One hundred parts by weight of a copolymer of 23.5 parts styrene and 76.5 parts butadiene, 3 parts by weight of zinc oxide, 1.5 parts by weight of stearic acid, 8 parts by weight of softener mix, 1.75 parts by weight of sulfur, 1.0 parts by weight of Flexamine, 1.25 parts by weight of Santocure (CBS) and 50 parts by weight of the carbon black product described in Example 3 are mixed on a roll mill to a homogeneous blend. The resulting compound which is representative of the rubber formulation designated herein as synthetic rubber recipe no. 3 is then cured at 293°F for a period of 60 minutes. Testing of the blend for conventional rubber properties reveals a tensile strength of 3970 p.s.i., a 300 percent modulus of 2460 p.s.i., an elongation of 405 percent and a Shore A hardness of 70. With regard to this formulation, the softener mix comprises equal portions of napthenic oil sold under the trade designation Circosol 42 XH by Sun Oil company and a saturated polymeric petroleum hydrocarbon sold under the trade name Paraplex by C. P. Hall Company. Flexamine is the trade designation of an antioxidant sold by U.S. Rubber Company. Santocure (CBS) is the trade designation for N-cyclohexyl-2-benzothiazole-sulfenamide, a curing agent for rubber systems.

EXAMPLE 11

For purposes of determining roadwear ratings, rubber vulcanizates of the formulation described fully hereinbefore are prepared utilizing each of the blacks prepared in Examples 1, 2 and 3. Moreover, as mentioned in the test procedures for determining roadwear ratings, the results are reported in the following TABLE I relative to Cabot's standard ISAF type black which is arbitrarily assigned a roadwear rating of 100 percent. Also included in TABLE I for purposes of comparison are roadwear ratings for a comprehensive group of rubber grade carbon blacks made and sold by Cabot Corporation under the trade name Vulcan.

TABLE I

| Carbon Black Sample | Representative Type of Carbon Black | (*Carbon Blacks made and sold by Cabot Corporation) Roadwear Rating Relative to Cabot's standard ISAF Black, 0/0 | [Tint + 0.6 ($D_n$)] |
|---|---|---|---|
| Example 1 | — | 109 | 304 |
| Example 2 | — | 110 | 306 |
| Example 3 | — | 112 | 301 |
| Vulcan 3* | HAF | 86 | 284 |
| Vulcan 3H* | HAF-HS | 93 | 291 |
| Vulcan 5H* | — | 98 | 304 |
| Vulcan 6* | ISAF | 100 | 291 |
| Vulcan 6H* | ISAF-HS | 102 | 302 |
| Vulcan 9* | SAF | 102 | 300 |
| Vulcan 9H* | SAF-HS | 103 | 286 |

It will be seen from the data presented in the above TABLE I that carbon blacks conventionally made and sold by Cabot Corporation for use in rubber as reinforcements, bearing the trade name designations of Vulcan 3 through Vulcan 9H carbon blacks, cover the standard range of rubber grade blacks, i.e., HAF type blacks through high structure SAF type blacks. This series of blacks is primarily used in the reinforcement of rubber formulations in view of the highly desirable physical properties exhibited by the resultant rubber compositions. It is also well known, however, that the roadwear rating of carbon black-containing rubber formulations is an extremely important factor to the manufacturer of treadstocks, and accordingly, higher levels of treadwear ratings are continually being sought.

As shown in the table, the roadwear ratings for the conventionally available rubber grade blacks range from a low of 86 percent to a high of 103 percent, based on Cabot's standard ISAF grade of carbon black. These standard blacks have been listed for reference purposes, but are, at best, only to be considered as slightly similar to the novel blacks of the present invention. As pointed out earlier, there are no better comparisons since blacks having BET surface areas higher than about 140 m²/g, i.e., the surface area approximately of a Vulcan 9 or Vulcan 9H type carbon black, have been considered to be of a porous nature. For example, there are available several blacks having BET surface areas in the range of 200 m²/g, such as Vulcan XC-72 and Vulcan SC carbon blacks made and sold by Cabot Corporation. It has been, however, the opinion of those skilled in the rubber grade carbon black art that blacks, such as Vulcan XC-72 and Vulcan SC blacks, which have BET surface areas in this range and are porous would lead to poor reinforcement properties and a rapid deterioration or breakdown of tires prepared from treadstocks containing these blacks. As a matter of interest, the Vulcan SC and Vulcan XC-72 type carbon blacks are emphasized to be useful in rubber compositions for imparting good electrical conductivity properties.

It is apparent, therefore, that the closest blacks for reference purposes are indeed the conventional rubber grade blacks presented hereinabove. With this in mind, it is at once obvious that the unique non-porous, high surface area blacks of the present invention perform in a completely contrary manner to that expected since there is no rapid breakdown of the treadstocks but rather the treadwear ratings average about 100 percent of the Cabot standard ISAF black. This treadwear rating is from 7 to 24 percent higher than the treadwear ratings characteristic of treadstocks prepared with the standard series of rubber grade carbon blacks. It is also to be noted from the data in TABLE I that the tint factor relationship is of approximately the same order for both the blacks of this invention and the conventional rubber grade blacks. This is an indication that the strength of the present group of blacks in respect to rubber reinforcement, especially treadwear ratings, is attributable to the nonporous nature of the blacks having such high BET surface areas.

In order to present a more convenient comparison of the use of the blacks of this invention as rubber grade blacks with the conventional rubber grade carbon blacks produced and sold by Cabot Corporation, there are presented the following two tables. In TABLE II there is shown for each of the blacks mentioned therein a summary of analytical properties. The data on the recipe No. 1. The data on the conventional rubber grade carbon blacks is published and distributed widely by Cabot Corporation and particular emphasis has been placed herein on Technical Report RG-130 entitled, "Cabot Corporation Blacks in a Variety of Elastomers" published by Cabot Corporation in January 1970. In this technical report, on pages 4 and 6, there is disclosed values for the physical properties of natural and synthetic rubber (SBR) formulations containing all of the conventionally available rubber blacks. It is this data which is reproduced in TABLE III for each of the conventional blacks regarded herein as control blacks. In addition, there is included in TABLES II and III data on Industry Reference Black No. 3 (heinafter referred to as IRB No. 3) inasmuch as this black has been the industry accepted reference black since June 1970. The data on IRB No. 3 reproduced hereinbelow is found in Technical Service Report TG-70-1 entitled, "Industry Reference Black No. 3", written by Messrs. Juengel and O'Brien and published by Cabot Corporation on Apr. 1, 1970. Finally, it will be noted that the analytical and physical properties of the blacks of the present invention as described in the tables have been completely disclosed in the examples of this application.

TABLE II

Analytical Properties of Carbon Blacks

| Carbon Black Sample | Example 1 | Example 2 | Example 3 | Vulcan 3* | Vulcan 3H* | Vulcan 5H* | Vulcan 6* | Vulcan 6H* | Vulcan 9* | Vulcan 9H* | IRB No. 3 |
|---|---|---|---|---|---|---|---|---|---|---|---|
| Iodine Surface Area, m$^2$/g | 141 | 130 | 158 | 65 | 70 | 80 | 98 | 104 | 114 | 118 | 67 |
| BET Surface Area, m$^2$/g | 170 | 160 | 163 | 82 | 90 | 101 | 118 | 116 | 142 | 124 | 82 |
| t Area, m$^2$/g | 162 | 154 | 159 | 82 | 90 | 101 | 117 | 116 | 142 | 124 | 84 |
| Ratio t Area/BET Area | 0.95 | 0.96 | 0.97 | 1 | 1 | 1 | 0.99 | 1 | 1 | 1 | 1.02 |
| Extract, % | 0.03 | 0.03 | 0.10 | 0.05 | 0.17 | 0.07 | 0.07 | 0.06 | 0.06 | 0.05 | — |
| DBP cc/100g black (on pellets) | 145 | 142 | 135 | 102 | 122 | 130 | 115 | 126 | 114 | 135 | 100 |
| Tinting Strength, % SRF | 255 | 254 | 260 | 203 | 205 | 225 | 232 | 243 | 250 | 231 | 208 |
| Tint Factor | 304 | 306 | 301 | 284 | 291 | 304 | 291 | 302 | 300 | 286 | 285 |

(*Carbon blacks made and sold by Cabot Corporation)

more important physical properties resulting from the use of each of the blacks in both natural and synthetic rubber formulations are presented in TABLE III hereinbelow. It will be recalled that the natural rubber recipe used herein is the ASTM natural rubber formula. In respect to the three different rubber formulations utilized herein, these are designated for purposes of convenience and ease of reference as synthetic rubber recipe no. 1, 2 and 3. The formulation of synthetic rubber recipe no. 1 is, in fact, that which is referred to as ASTM industry synthetic recipe; the formulation of synthetic rubber recipe no. 2 is the same as that employed in determining roadwear ratings as shown earlier; and the formulation of synthetic rubber recipe no. 3 is a slight variation of the ASTM industry synthetic In regard to the above Table II, it is to be noted that an attempt has been made to compare the novel rubber reinforcing blacks of the present invention with conventionally available blacks which are as similar as possible in all respects. In selecting the control blacks, accordingly, there has been provided a representative group of available blacks made and sold by Cabot Corporation under the trade name, Vulcan, which are similar in that these blacks are non-porous rubber reinforcing blacks. It is obvious, however, that none of the reference blacks have comparable BET surface areas. This listing of blacks is sufficiently representative to permit an effective evaluation thereof in the reinforcement of natural and synthetic rubber formulations as demonstrated in Table III.

TABLE III

Physical Properties of Natural and Synthetic Rubber Vulcanizates

| Carbon Black Sample | Example 1 | Example 2 | Example 3 | Vulcan 3* | Vulcan 3H* | Vulcan 5H* | Vulcan 6* | Vulcan 6H* | Vulcan 9* | Vulcan 9H* | IRB No. 3 |
|---|---|---|---|---|---|---|---|---|---|---|---|
| NATURAL RUBBER RECIPE | | | | | | | | | | | |
| Tensile, p.s.i. | — | 4180 | 3520 | 4000 | 3850 | 3850 | 4075 | 4100 | 4400 | 4150 | 4137 |
| 300% Modulus, p.s.i. | — | 2280 | 2300 | 2400 | 2600 | 2550 | 2300 | 2500 | 2250 | 2550 | 2300 |
| Elongation, % | — | 500 | 420 | 470 | 460 | 480 | 530 | 490 | 530 | 510 | 495 |
| Shore Hardness | — | 60 | 69 | 65 | 67 | 67 | 66 | 67 | 66 | 68 | 67 |
| SYNTHETIC RUBBER RECIPE No. 1 | | | | | | | | | | | |
| Tensile, p.s.i. | — | 4750 | 4080 | 4050 | 3950 | 4050 | 4250 | 4150 | 4700 | 4500 | 4251 |
| 300% Modulus, p.s.i. | — | 2700 | 2560 | 2450 | 2800 | 2750 | 2550 | 2750 | 2600 | 2800 | 2456 |

TABLE III-continued

Physical Properties of Natural and Synthetic Rubber Vulcanizates

| Carbon Black Sample | Example 1 | Example 2 | Example 3 | Vulcan 3* | Vulcan 3H* | Vulcan 5H* | Vulcan 6* | Vulcan 6H* | Vulcan 9* | Vulcan 9H* | IRB No. 3 |
|---|---|---|---|---|---|---|---|---|---|---|---|
| Elongation, % | — | 460 | 430 | 500 | 470 | 470 | 520 | 490 | 510 | 490 | 483 |
| Shore Hardness | — | 65 | 74 | 67 | 69 | 69 | 68 | 69 | 69 | 71 | 70 |
| SYNTHETIC RUBBER RECIPE NO. 2 | | | | | | | | | | | |
| Tensile, p.s.i. | 2800 | 2870 | — | 2650 | 2610 | 2670 | 2780 | 2750 | 2910 | — | — |
| 300% Modulus, p.s.i. | 990 | 1090 | — | 850 | 1070 | 1100 | 1030 | 1160 | 820 | — | — |
| Elongation, % | 590 | 570 | — | 650 | 600 | 580 | 590 | 570 | 630 | — | — |
| Shore Hardness | 59 | 60 | — | 51 | 53 | 53 | 55 | 57 | 56 | — | — |
| Roadwear, % ISAF | 109 | 110 | 112 | 86 | 93 | 98 | 100 | 102 | 102 | 103 | — |
| SYNTHETIC RUBBER RECIPE NO. 3 | | | | | | | | | | | |
| Tensile, p.s.i. | — | — | 3970 | — | — | — | 4020 | 3760 | 4150 | 3520 | — |
| 300% Modulus, p.s.i. | — | — | 2460 | — | — | — | 1990 | 2340 | 2010 | 2090 | — |
| Elongation, % | — | — | 405 | — | — | — | 505 | 460 | 490 | 470 | — |
| Shore Hardness | — | — | 68 | — | — | — | 65 | 67 | 67 | 70 | — |

(*Carbon blacks made and sold by Cabot Corporation)

A study of the data presented above reveals that the novel blacks of the present invention are as effective as the conventional rubber grade blacks in reinforcing natural rubber vulcanizates and synthetic rubber vulcanizates. Moreover, while the important physical properties of tensile strength, modulus and elongation are maintained at levels equivalent to that obtained with the conventional rubber grade blacks, it is also noted that other desirable performance characteristics of the rubber compositions of the present invention are achieved by the incorporation of the carbon blacks of the present invention. Most importantly, however, it is clearly evidenced by the data in TABLE III that a marked improvement in roadwear ratings or treadstocks is achieved by utilizing as reinforcements the non-porous high surface area blacks of the present invention rather than the conventional rubber grade blacks. In the present instance, as shown hereinbefore, the improvement in treadwear rating ranges from about 7 to about 24 percent higher than that resulting from the use of the conventional rubber grade blacks.

Numerous chemical curing systems have been found useful in promoting the interaction of the carbon black reinforcement and the natural or synthetic rubber in practicing the present invention. Exemplary of the chemical curing agents are mercaptobenzothiazyl disulfide (MBTS), N-cyclohexyl-2-benzothiazole-sulfenamide and tetramethylthiuramdisulfide (TMTD). Furthermore, for many purposes, it may be desirable to compound the rubber compositions of the present invention with other conventional rubber additives. Illustrative of such additives are other materials such as titanium dioxide, silicon dioxide, zinc oxide, calcium carbonate, clays, calcium silicate, zinc sulfide, hydrous alumina and calcined magnesia; thermoplastic resins such as polyvinyl chloride and epoxy resins as compounding substances; vulcanizing agents; vulcanization accelerators; accelerator activators, sulfur curatives; antioxidants; decelerators; heat stabilizers; plasticizers, softeners or extender oils such as mineral oil, resins, fats, waxes, petroleum distillates, vegetable oils, e.g., linseed oil and soybean oil, butyl cellosolve pelargonate, di-n-hexyl adipate, trioctyl phosphate, chlorinated hydrocarbons, ether, ketones, terpenes, gum turpentine, rosin, pine tar, coal tar products including alkyl naphthalenes and polynuclear aromatics and liquid polymers of conjugated dienes; and the like. It will be apparent that compositions containing such other additives are within the scope of this invention.

While this invention has been described with respect to certain embodiments, it is not so limited, and it should be understood that variations and modifications thereof may be made which are obvious to those skilled in the art without departing from the spirit or scope of the invention.

The embodiments of the invention in which an exclusive property or privilege is claimed are defined as follows:

1. A carbon black product characterized by having a total surface area of at least about 160 m$^2$/g, a value for the ratio of non-porous specific surface area to total surface area of the carbon black of at least 0.9, a value for the tint factor relationship of, wherein $D_a$ is apparent diameter of less than 317, and a DBP absorption of at least 90 cc/100 gms of black.

2. A carbon black product as defined in claim 1 wherein the total surface area is at least 170 m$^2$/g.

3. A carbon black product as defined in claim 1 wherein the DBP absorption is at least 100 cc/100 gms of black.

4. A carbon black product as defined in claim 1 wherein the total surface area is 170 m$^2$/g, and the value for the ratio of non-porous specific surface area to total surface area of the carbon black is 0.95.

5. A carbon black product as defined in claim 1 wherein the total surface area is 160 m$^2$/g, and the value for the ratio of non-porous specific surface area to total surface area of the carbon black is 0.96.

6. A carbon black product as defined in claim 1 wherein the total surface area is 163 m$^2$/g, and the value for the ratio of non-porous specific surface area to total surface area of the carbon black is 0.97.

* * * * *

UNITED STATES PATENT OFFICE
CERTIFICATE OF CORRECTION

PATENT NO. : 3,973,983
DATED : August 10, 1976
INVENTOR(S) : Merrill E. Jordan and William G. Burbine It is certified that error appears in the above-identified patent and that said Letters Patent are hereby corrected as shown below:

In the Claims:

Claim 1, line 5, after "of" insert -- [tinting strength + 0.6 $D_a$] --.

Signed and Sealed this

First Day of March 1977

[SEAL]

Attest:

RUTH C. MASON
Attesting Officer

C. MARSHALL DANN
Commissioner of Patents and Trademarks